Sept. 15, 1959  T. DOLEMAN  2,904,092
PNEUMATIC WHEELS FOR VEHICLES
Filed Nov. 2, 1956  2 Sheets-Sheet 1

Inventor
Thomas Doleman
By Leon Simon
Attorney

Sept. 15, 1959 T. DOLEMAN 2,904,092
PNEUMATIC WHEELS FOR VEHICLES
Filed Nov. 2, 1956 2 Sheets-Sheet 2
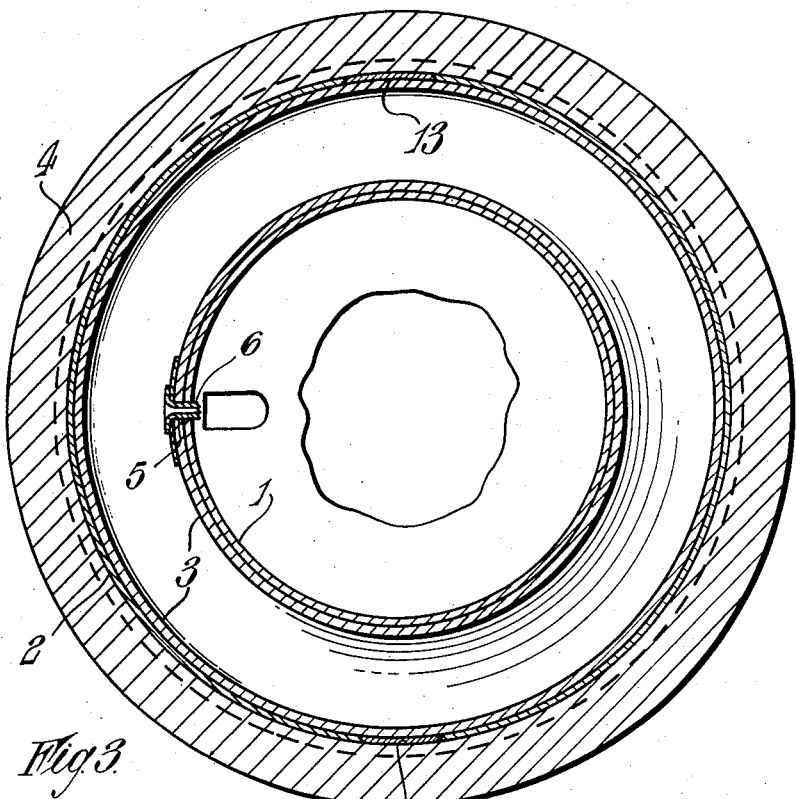
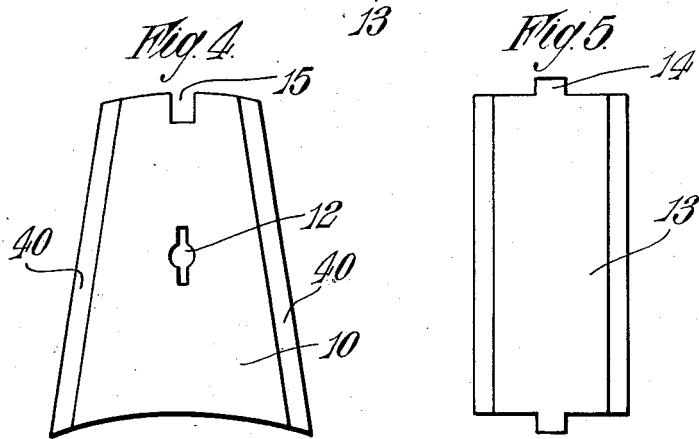
Inventor
Thomas Doleman
By Leon Simin
Attorney 2,904,092

PNEUMATIC WHEELS FOR VEHICLES

Thomas Doleman, Worksop, England

Application November 2, 1956, Serial No. 620,142

3 Claims. (Cl. 152—57)

The faults inherent in the pneumatic tyre are well known. The principal ones being liability to puncture and burst, these faults are sources of danger and inconvenience. The "spare wheel" complete with pneumatic tyre carried almost invariably on all motor vehicles, represents an attempt to minimise inconveniences caused by both punctures and bursts. The object of the invention hereinafter described is to eliminate these faults and to present other advantages.

This invention consists essentially of two separate wheel rims, a radially inner rim to house a pneumatic tube, and a sectional radially outer rim which fits over and round the inner rim on three sides, said outer rim carrying a solid or cushion tyre of rubber or other suitable material, and comprising two large rim segments spacedly connected by means of wedge-shaped side plate segments, the pneumatic tube resiliently separating the inner and outer rims.

The tyre carried by the outer rim is the only part of the device which comes into contact with the road surface and can conveniently be termed the "Road Tyre" in relation to this invention.

In order that the invention may be more clearly understood and readily carried into effect the same will now be more fully described with reference to and by the aid of the accompanying drawings, wherein:

Figure 3 is a circumferential section of the wheel of Figure 1.

Figure 4 is an elevation of a member forming a feature of the invention, drawn to a larger scale.

Figure 5 is a plan view of a further detail of the invention, drawn to a larger scale.

Figure 1:
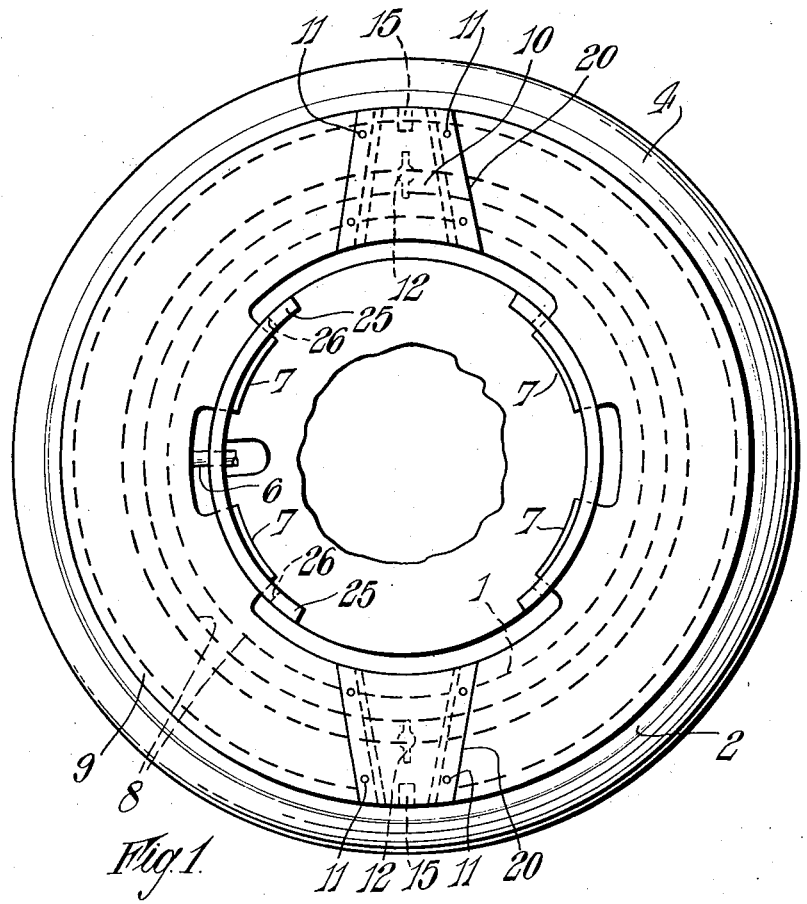
Figure 1 is a side elevation of a wheel embodying the invention.
Figure 2:
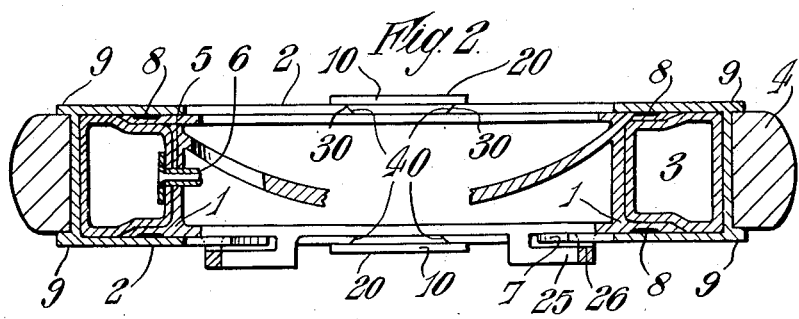
Figure 2 is a cross section of the wheel of Figure 1.

Referring to the drawings, the wheel is built up of two separate rims 1, 2, the radially inner rim 1 to house a pneumatic tube 3 and the sectional radially outer rim 2 which fits over and round the inner rim 1 on three sides and carries a solid or cushion tyre 4 of rubber or other suitable material.

The two separate rims 1, 2, can be made of mild steel or any other material normally used in the construction of wheel rims for cars, lorries, buses, tractors or aircraft. The difference in the two diameters of the rims 1, 2, governs the amount of movement or cushioning that can be obtained as between the two separate rims. The function of the pneumatic tube 3 is resiliently to separate the inner and outer rims 1, 2, when the pneumatic tube is inflated.

The difference in the diameters of the two separate rims will be determined by experience and practical considerations, such as the load which any wheel has to carry, which remarks also apply to the dimensions of the component parts of the device itself.

The inner rim 1 can be made as an integral part of the wheel itself and can be of substantially either U section or channel section ⊔, or modifications of either or both: and will be of such dimensions as to adequately house the pneumatic tube 3. A suitable hole 5 is provided in the base of the inner rim 1 to allow the air valve 6 of the pneumatic tube to be positioned for inflation or deflation purposes. The pneumatic tube 3 is packed around as much of its surface area as deemed desirable by suitable packing material (not shown) so as to prevent the tube itself from coming into direct contact with the metal forming the inner rim 1 and also the metal forming the base of the outer rim 2. This packing may take the form of a gaiter and assist in gripping the inner and outer rims. Extra packing can be provided between the pneumatic tube and the metal base of the outer rim, which extra packing forms an adequate buffer between the tube itself and the base of the outer rim.

The inner rim 1 may be provided on the outside surface of its two side walls with suitable axially outwardly projecting lugs of convenient design, size and number. These lugs if provided will be securely fastened to the outer walls of the U section or channel section rim, preferably by welding and can be designed so as to form guides for engagement in slots which may be formed in the outer rim side walls.

An axially outwardly projecting flange 25 may be provided on the inner rim 1, which is slotted at 26 to receive radially inwardly pointing lug extensions 7 provided on the outer rim, to prevent relative rotation of the outer and inner rims.

It will readily be seen that the free ends of the U section or channel section rim will form the outer periphery of the inner pneumatic tube carrying rim. The outer rim 2 of the device, which carries the "road tyre" 4 is fashioned in the reverse way to the inner rim and is of such dimensions as to cover the inner rim 1 on three sides, and made so as to be a sliding fit on the inner rim.

Suitable seals 8 can be provided between the rubbing surfaces of the two separate rims to prevent water or other matter finding a way into the inner rim well which houses the penumatic tube.

The outer rim 2 carrying the "road tyre" 4 is provided with substantially continuous radial extension flanges 9 whose purpose is to prevent the "road tyre" 4 from working off the rim in a sideways manner. Small ribs may be formed on the rim to ensure that road tyre 4 exerts a better grip thereon.

It will readily be seen that it would be impossible to make the outer rim 2 in one piece and get it on and around the inner rim 1.

It has been found practicable to make the outer rim 2 in two large segments, and four relatively small flat plate wedge shaped members 10 for purposes of assembly. When the two large outer rim segments 2 are placed on and around the inner rim 1 an ellipse is formed which allows the "road tyre" to be assembled onto the outer rim segment and rest between the flanges provided thereon.

If the pair of large outer rim segments are then expanded the metal base of the outer rim segments will force the "road tyre" 4 out to its extreme diameter. This is what takes place when the pneumatic tube 3 is inflated.

When the pneumatic tube 3 is inflated, four gaps are formed in the two side walls between the two large outer rim segments 2 and it is across these four gaps of wedge shape that the four small flat wedge shaped plate segments 10 are inserted and secured.

The edges 30 of the large outer rim segments 2 and the edges 40 of the flat plate segments 10 are chamfered, the latter being secured in place by screws in the holes 11 provided. Double keyhole apertures 12 may be provided in the wedge members 10 to facilitate the use of a suitable key or tool when placing the wedges in position between the outer rim segments or removing them. An alternative means of fastening the two large outer rim segments and the four small wedge shaped flat plate segments 10 can also be provided with outwardly projecting flanges 20 so as to be capable of being secured together by bolts.

When this has been done the completely circular outer rim is formed and the "road tyre" 2 firmly gripped due to the outer rim segments being expanded inside the "road tyre" by the inflation of the pneumatic tube.

It will be appreciated that there will be two small gaps in the continuity of the base of the outer rim which carries the "road tyre." The width of the two gaps will be same as the width of the small end of any one of the small flat plate wedge shaped segments.

It is desirable to preserve the continuity of the metal base of the outer rim carrying the "road tyre."

This is done by fixing two small metal plates 13 of the exact size to fit the two gaps in exact positions opposite each other on to the inner face of the "road tyre" 4 which plates drop into position in their appropriate gaps when the tyre is expanded by the inflation of the pneumatic tube.

Tongues 14 are formed in the plates 13 which enter slots 15 formed in the plate segments 10 when they are in position.

From the foregoing specification it will be seen that this device provides for a pneumatic tube housed in a metal chamber one half of which can move in a radial manner over the other half. The pneumatic tube provides a limited amount of cushioning and is completely protected from puncturing from outside sources. At the same time, any sudden expansion of the tube which would produce a burst in any ordinary pneumatic tyre is prevented.

In addition extreme heat can have little influence on expansion due to the limits imposed by the metal walls of the pneumatic chamber formed by the inner and outer rims.

The "road tyre" in this device will be simple and cheap to make and cuts in the tyre cannot impair its efficiency, and it will be possible to cut a new tread in the tyre when the original tread has worn off. It may be possible to increase the width of tyre treads without increasing the wheel diameter by making the pneumatic tube rectangular or elliptical on its transverse section. This will in no way effect the fashioning of the "road tyre" except that the tyre will be wider. A spare wheel will not be needed and it may be possible to reduce the number of wheels per given load due to the possible increase in tyre width.

It will be virtually impossible to burst the pneumatic tube by overloading or by over-inflation. Under-inflation can do little damage and the pneumatic tube can only fail through becoming porous or perishing. In the event of deflation of the pneumatic tube the displacement in the wheel will be small in extent and can never be more than the difference in the outer and inner diameters of the inner and outer rims respectively of the wheel. Thus a source of danger is minimised especially on vehicles carrying large numbers of passengers or large or heavy loads, or on vehicles travelling at speed with special reference to the landing wheels of aircraft.

I claim:

1. In a pneumatic wheel the combination of two separate wheel rims comprising a one piece inner rim housing a pneumatic tube and a segmented sectional radial outer rim which fits closely over and around the inner rim on three sides thereof, said outer rim carrying a road tyre of rubber, wedge-shaped side plates connecting segments of the outer rim together, said pneumatic tube resiliently separating the inner and outer rims and continuously supporting the outer rim.

2. In a pneumatic road wheel the combination of two separate wheel rims, a one piece inner rim of channel shaped cross-section housing a pneumatic tube and an outer rim comprising a pair of radial segments of channel shaped cross-section having a close sliding fit in a radial direction over and around the inner rim on three sides thereof, said outer rim carrying a road tyre of rubber, wedge-shaped side plates connecting the pair of segments together, said pneumatic tube resiliently separating the inner and outer rims and continuously supporting the outer rim.

3. In a pneumatic road wheel the combination of two separate wheel rims, a one piece inner rim of channel shaped cross-section housing a pneumatic tube and an outer rim comprising a pair of radial segments of channel shaped cross-section having a close sliding fit in a radial direction over and around the inner rim on three sides thereof, said outer rim carrying a road tyre of rubber, wedge-shaped side plates connecting the pair of segments together said pneumatic tube resiliently separating the inner and outer rims and continuously supporting the outer rim, said inner rim having an outwardly projecting flange formed with a slot to receive radially inwardly projecting lug extensions on the outer rim.

References Cited in the file of this patent
UNITED STATES PATENTS

| | | |
|---|---|---|
| 1,342,271 | Anderson | June 1, 1920 |
| 1,359,964 | Charter | Nov. 23, 1920 |
| 1,600,989 | Meyer | Sept. 28, 1926 |
| 1,618,128 | Overman | Feb. 15, 1927 |